United States Patent
Harris et al.

(10) Patent No.: US 7,475,096 B2
(45) Date of Patent: Jan. 6, 2009

(54) SYSTEM FOR DISTRIBUTED COMMUNICATIONS

(75) Inventors: Robert Harris, Christchurch (GB); Arden L. Stewart, Stockbridge (GB)

(73) Assignee: International Business Machines Corporation, Armond, NY (US)

( * ) Notice: Subject to any disclaimer, the term of this patent is extended or adjusted under 35 U.S.C. 154(b) by 453 days.

(21) Appl. No.: 10/984,158

(22) Filed: Nov. 9, 2004

(65) Prior Publication Data
US 2005/0120008 A1    Jun. 2, 2005

(30) Foreign Application Priority Data
Nov. 28, 2003    (GB)    ................. 0327694.6

(51) Int. Cl.
*G06F 17/30*    (2006.01)

(52) U.S. Cl. ........................................ 707/203; 707/10
(58) Field of Classification Search ................. 707/203, 707/10; 704/2
See application file for complete search history.

(56) References Cited
U.S. PATENT DOCUMENTS
6,226,649 B1 *    5/2001    Bodamer et al. .......... 707/104.1
2004/0122753 A1 *    6/2004    Yap et al. ...................... 705/34
2005/0010394 A1 *    1/2005    Bergeron et al. ............... 704/9

* cited by examiner

*Primary Examiner*—John Cottingham
*Assistant Examiner*—Noosha Arjomandi
(74) *Attorney, Agent, or Firm*—David Irvin, Esq.; Steven M. Greenberg, Esq.

(57) ABSTRACT

A system for use in a distributed environment comprising a first data processing system having a first entity (e.g. and object) and a second data processing system having a second entity. The first entity sends a request for an operation associated with the second entity. The request comprises an operation identifier in a first format (e.g. a first national language) and the operation comprises an operation identifier in a second format (e.g. a second national language). The environment also comprises a data structure comprising an association between the operation identifier in the first format and the operation identifier in the second format. The system comprises an intercept component for intercepting the request, a search component for searching the data structure for the operation identifier in the first format and a map component for mapping the operation identifier in the first format to the operation identifier in the second format.

1 Claim, 3 Drawing Sheets

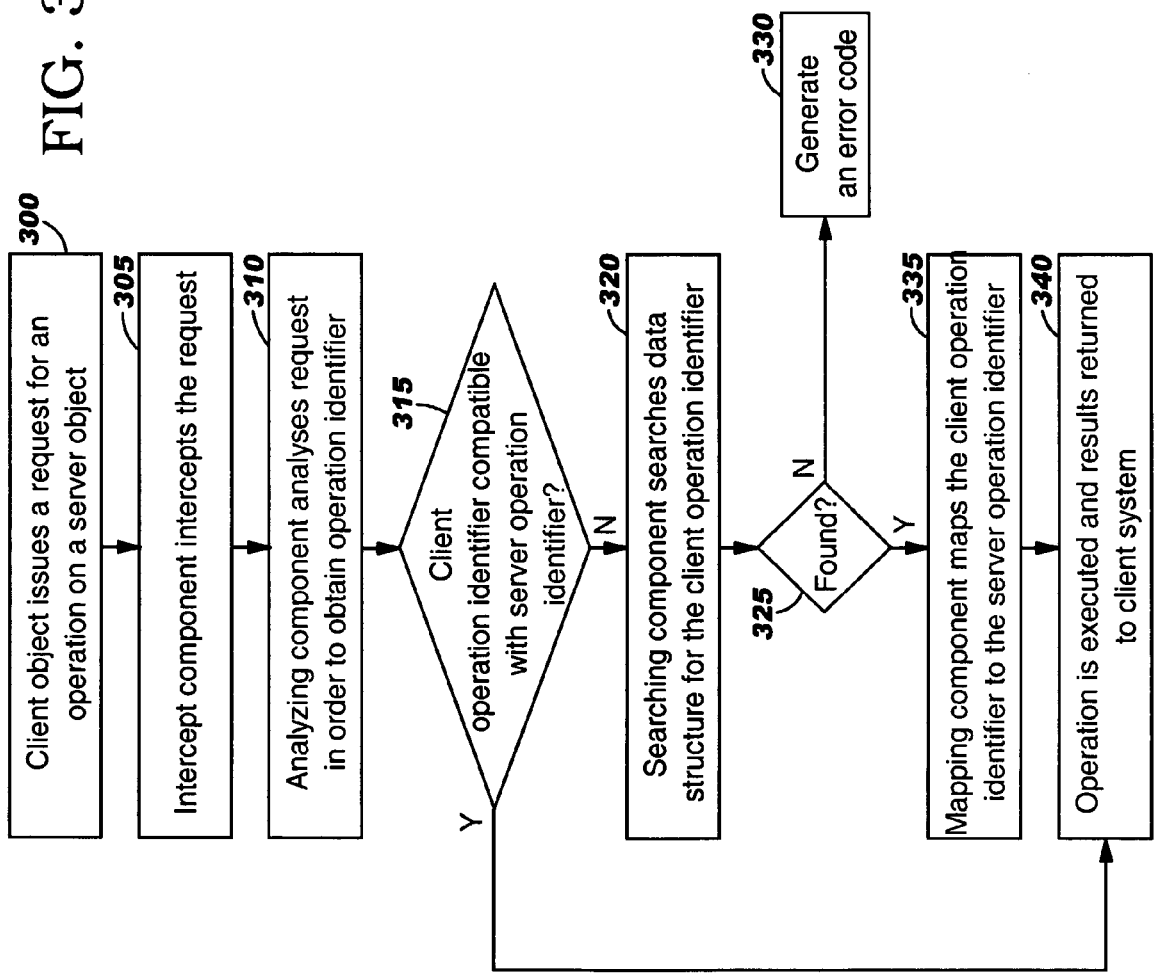

SYSTEM FOR DISTRIBUTED COMMUNICATIONS

FIELD OF THE INVENTION

The present invention relates to a system, method and computer program for distributed communications.

BACKGROUND OF THE INVENTION

Client/server computing has become more and more widespread over the past few years in the information technology world. Communication in a client/server, distributed environment is important and allows one entity (the client) to delegate an operation (that defines work to be done) to another entity (the server) that might, for example, be on a different machine and be better suited to perform the operation. A typical request for an operation comprises one or more portions for example, an identifier to identify the operation, arguments that are used when executing the operation etc. Once the operation has executed, a reply can be sent to the system on which the client entity is running. Note that the term "client" is used to refer to an entity that sends a request and the term "server" is used to refer to the entity that receives a request. Generally all servers are capable of behaving as clients.

The client entity and server entity can be developed in different formats (e.g. different national languages, different character sets (e.g. Double Byte Character Set (DBCS)—wherein two bytes are used to represent each character, Single Byte Character Set (SBCS)—wherein one byte is used to represent each character). Therefore, a request for an operation developed in one format will not be compatible with the operation developed in another format.

This problem will now be described with reference to a distributed communication mechanism in an Object Oriented (OO) environment. In the OO environment, an object includes data and operations, known as methods that operate on the data. A method has a name (i.e. an identifier), a set of parameters (input, output), a return value and a set of exceptions (usually only relevant for a failure) that can be returned as a result of executing the method. Together these form the signature of a method. The data and methods are tightly bound together within the object, and this integration is known as encapsulation.

A client entity (i.e. a client object) can request a server entity (i.e. a server object) to carry out work on its behalf. For example, when a client object wishes to make a request to invoke an operation on a server object, it first locates a server that supports the server object. Having found a suitable server it then sends it the request. The request may comprise a method to be called with a list of input and output parameters, wherein the method defines the task to be done. The method is invoked by program code on the server, which executes the method on the server object, and results (e.g. a returned value, a data structure, an exception etc.) can be returned to the system on which the client object is running.

The methods available on the server object are determined at object development time. In general, an object's interface provides a set of definitions for method signatures. The client object (and any other client object) must use the set of definitions (and therefore a method name of a method signature) to access the server object. The set of definitions (and therefore the method names that they define) is format specific. Therefore, a client object that sends a request in a different format to the server object is incompatible with the server object.

Prior art mechanisms that address this problem are available. A first mechanism the OO environment is a "wrapper". In an environment wherein a client object is constructed in a first format and a server object is constructed in a second format, a wrapper adapts the interface of the server object so that it is compatible with the first format of the client object. Thus, when the client object sends a request in the first format, the wrapper translates it into the second format for consumption by the server object. Likewise, when the server object sends a response in the second format, the wrapper translates it into the first format for consumption by the client object. Although this mechanism allows incompatible objects to communicate, there is a performance overhead involved and furthermore, development of wrappers can be time consuming and complex.

A second mechanism in the OO environment uses duplicate objects, each having method names constructed in a particular format. For example, a server object with method names constructed in a first language (e.g. German), is duplicated, wherein each duplicated object has method names constructed in another language (e.g. a duplicated object with method names in English, a duplicated object with method names in Swedish etc.). Therefore, a client object constructed in English, can access a duplicated server object that has method names constructed in English. Disadvantageously, this system is inefficient as there is duplication of code.

A third mechanism is to provide several format specific versions of an operation in a dynamic link library (DLL) (i.e. a DLL comprising the operation constructed in French, English, German etc.), or to have one format specific version of the operation per DLL (e.g. a DLL comprising the operation constructed in French, another DLL comprising the operation constructed in English etc.). In an example, before an entity constructed in English can request an operation on an entity constructed in French, a DLL is set up comprising the operation constructed in French. Next, the entity constructed in English needs to know the location of the DLL, so that it can call that DLL when required. This causes the operation constructed in French to be executed. In this example, although incompatible entities can still communicate, the requesting entity needs to have knowledge of the DLL.

There is a need for an improved mechanism to allow client and server entities to communicate if they are developed according to different formats.

SUMMARY OF THE INVENTION

According to a first aspect the present invention provides a system for distributed communications for use in a distributed environment comprising a first data processing system having an associated first entity; a second data processing system having an associated second entity; wherein the first entity sends a request to the second data processing system for an operation associated with the second entity, the request comprising an operation identifier in a first format and the operation comprising an operation identifier in a second format; and a data structure comprising an association between the operation identifier in the first format and the operation identifier in the second format; the system comprising: an intercept component for intercepting the request; a search component, responsive to the intercept component, for searching the data structure for the operation identifier in the first format; and a map component, responsive to a successful search, for mapping the operation identifier in the first format to the operation identifier in the second format.

Preferably, the system comprises means, responsive to the map component, for executing the request on the second entity. Preferably, the system comprises an analysis component for analysing the request in order to determine the operation identifier in the first format. In one embodiment, the request is parsed in order to determine the operation identifier in the first format.

In a preferred embodiment, the system comprises a comparison component for comparing the operation identifier in the first format with the operation identifier in the second format in order to determine whether the operation identifiers are compatible. If the operation identifiers are compatible, the operation is sent and executed directly. The search component is preferably operated in response to an unsuccessful comparison.

In a preferred implementation, the distributed environment is an object oriented environment, the first entity is a first object and the second entity is a second object. In a preferred implementation, the request is a method call, the operation is a method and the operation identifiers are method names.

In one embodiment, one of the first and second formats is a first national language (e.g. English) and the other of the first and second formats is a second national language (e.g. French). In another embodiment, one of the first and second formats is Double Byte Character Set (e.g. Simplified Chinese) and the other of the first and second formats is Single Byte Character Set (e.g. English). In yet another embodiment, one of the operation identifiers is a deprecated operation identifier (e.g. Get) and the other of the operation identifiers is a replacement operation identifier (e.g. Obtain).

According to a second aspect, the present invention provides a method of distributed communications for use in a distributed environment comprising a first data processing system having an associated first entity; a second data processing system having an associated second entity; wherein the first entity sends a request to the second data processing system for an operation associated with the second entity, the request comprising an operation identifier in a first format and the operation comprising an operation identifier in a second format; and a data structure comprising an association between the operation identifier in the first format and the operation identifier in the second format; the method comprising the steps of: intercepting the request; searching, in response to the intercepting step, the data structure for the operation identifier in the first format; and mapping, in response to the searching step, the operation identifier in the first format to the operation identifier in the second format.

According to a third aspect, the present invention provides a computer program comprising program code means adapted to perform all the steps of the method as described above when said program is run on a computer.

Advantageously, the present invention allows entities that are incompatible to communicate without requiring any additional code or other function within the entities themselves.

This is beneficial to a user at the first data processing system, because the second entity can be accessed transparently. In the prior art DLL mechanism, a user needs to be aware of how to invoke the DLL in order to allow incompatible entities to communicate. Advantageously, a user does not need such knowledge in the present invention as the mapping from a first format to a second format occurs dynamically.

Another benefit is that the implementation of the present invention is simpler in terms of development and deployment effort than prior art mechanisms that modify the entities themselves.

Yet another benefit is that the present invention can support a variety of differing formats and is very flexible. This support is provided by utilizing different data structures, for example, a data structure mapping different languages, a data structure mapping DBCS to SBCS etc. This support is provided in a manner that is unobtrusive to the communicating entities.

BRIEF DESCRIPTION OF THE DRAWINGS

The present invention will now be described, by way of example only, with reference to preferred embodiments thereof, as illustrated in the following drawings:

FIG. 3 is a flow chart showing the operational steps involved in the communication of FIG. 2.

DETAILED DESCRIPTION OF THE PREFERRED EMBODIMENT

Figure 1:
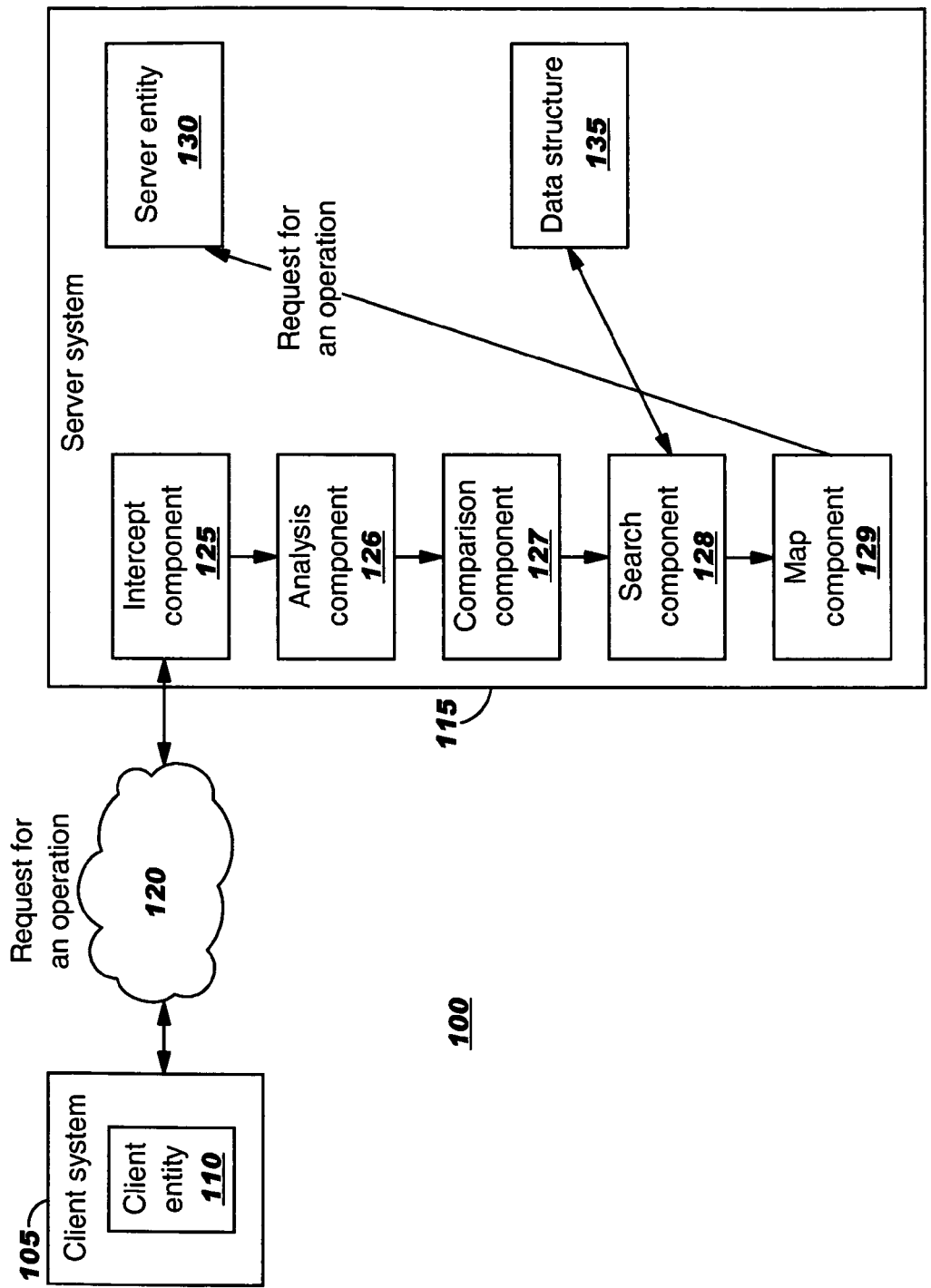
FIG. 1 shows an overview of a distributed system allowing a client entity sending a request in one format to communicate with a server entity constructed in another format.

FIG. 1 shows an overview diagram of a distributed environment (100) according to the present invention. The environment (100) comprises a client system (105) communicating with a server system (115) over a network (120). The client system (105) comprises a client entity (110) (e.g. a computer program, a process, an object etc.) and the server system (115) comprises a server entity (130), a plurality of components (125-129) and a data structure (135). It should be understood that the plurality of components (125-129) and the data structure (135) can be on one or more systems that are remote to the server and client systems.

The client entity (110) communicates with the server entity (130) by sending a request for an operation on the server entity (130) to the server system (115). Upon receiving the request, the server system (115) executes the operation on the server entity (130) and once the operation has been executed, a reply can be sent back to the client system (105).

Generally the present invention provides a mechanism that allows a client request for an operation constructed in one format to access the operation constructed in a second format. Therefore a client entity that is incompatible with a server entity can still communicate with it.

Figure 2:
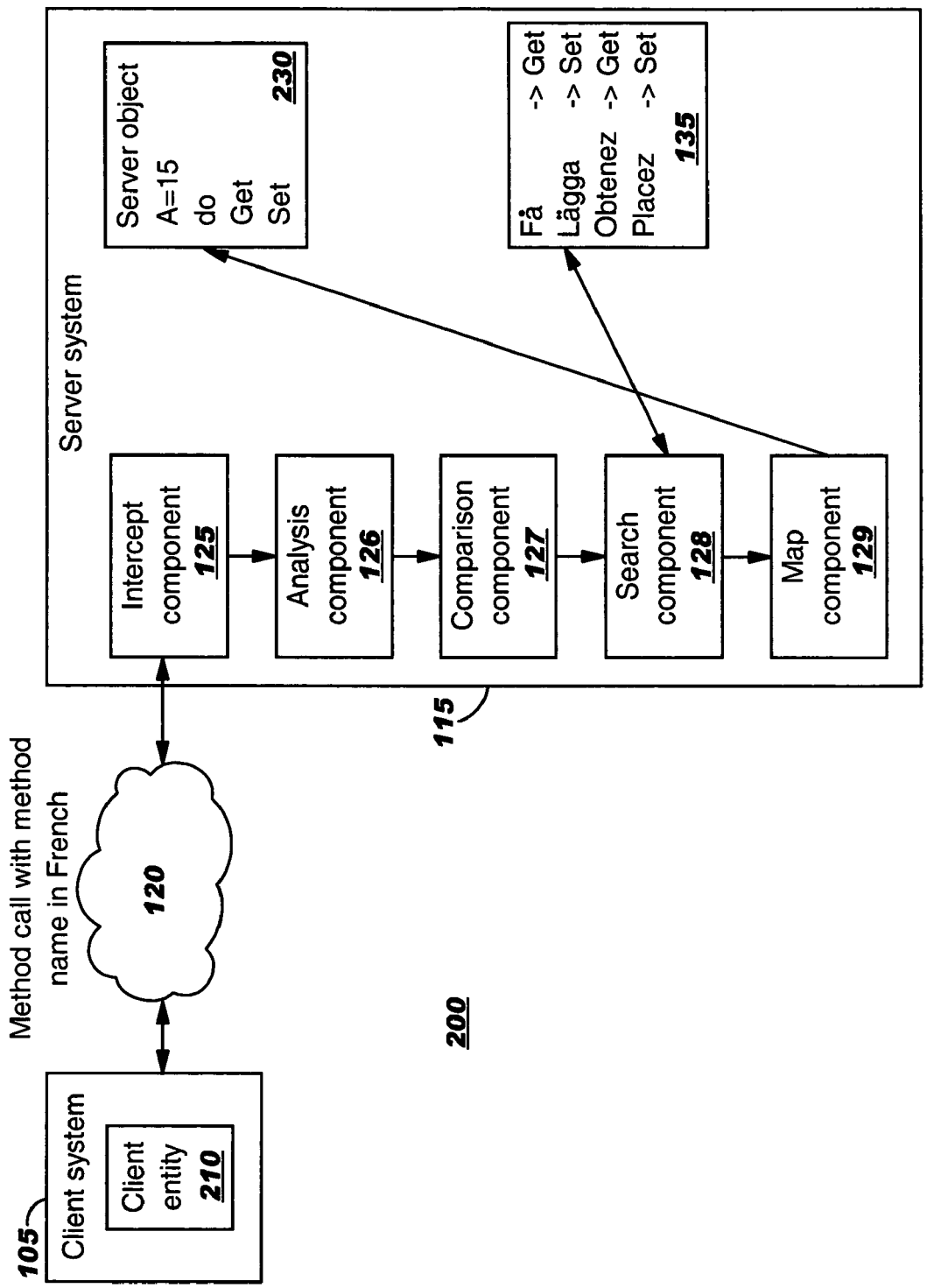
FIG. 2 shows an overview of an object oriented distributed system allowing a client entity sending a request in one language to communicate with a server entity constructed in another language.

The present invention will now be described with reference to FIG. 2 and FIG. 3. FIG. 2 shows an OO distributed environment (200), wherein the client entity is a client object (210) and the server entity is a server object (230) comprising state (i.e. a variable called "A", which holds some sort of persistent value). The methods that can be called on the server object (230) are Do, Get and Set and the methods manipulate the variable A. In a first example, the language of the server object (230) is English (i.e. a first format). The request comprises a method call constructed in French (i.e. a second format), wherein the method call comprises a method name (i.e. operation identifier) that identifies the method to be called (in this case, Obtenez); the state to be manipulated (in this case, A) and may comprise a list of input and output parameters.

The plurality of components comprises an intercept component (125), an analysis component (126), a comparison component (127), a search component (128) and a map component (129). The data structure (135) comprises a set of associations between the operation identifier in the request (in one or more first formats) and the operation identifier of the server object (230) operation (in a second format). In the data structure (135) of FIG. 2, method names in the one or more first formats that are present in associated requests (i.e Få, Lägga, Obtenez, Placez) are associated with the corresponding method names of the server object (230) methods (i.e. Get, Set) and stored. Preferably, the data structure (135) is constructed in a pre-processing phase.

Advantageously, because the data structure (135) is separate to the client object (210) and the server object (230), the use of the data structure (135) does not affect the development of the client object (210) or the server object (230). For example, extending support for method names in requests that are constructed in further first formats can be carried out in an unobtrusive manner by manipulating the data structure (135) rather than the client object (210) or the server object (230). This also allows the data structure (135) to be used with existing and newly developed objects, with no modification of the objects required.

The process of the present invention will now be described with reference to FIG. 3. In step 300, the client object (210) issues a method call (i.e. a request for an operation) to the server system (115). Next, the intercept component (125) intercepts (step 305) the method call and optionally passes it to the analysis component (126). The analysis component (126) analyses (step 310) the method call, in order to determine a method name (i.e. the operation identifier). The analysis component (126) can be implemented in a number of ways. In one embodiment, the analysis component (126) parses the request in order to determine the operation identifier. In another embodiment, the analyses component searches for a field in the request, wherein the field indicates the presence of the operation identifier. In this embodiment, the analysis component (126) parses the method call in order to determine the method name (i.e. Obtenez). It should be understood, that if the request comprises only an operation identifier, the system can be configured to pass the request directly to the comparison component (127) or to the search component (128).

Next, optionally, a comparison component (127) determines whether or not the format of the method name in the method call is compatible with the format of the method name of the server object (230) method, by comparing (step 315) the method name in the method call to the method names of the methods that can be called on the server object (230). In this first example, since the format of the method name in the method call is constructed in French and the method name of the server object (230) method is constructed in English, a negative result is returned to step 315 (i.e. Obtenez does not match Do, Get or Set).

Next, the comparison component (127) passes the method name in the method call to the searching component (128), which searches (step 320) the data structure (135) for the method name. If the method name is not found in the data structure (135) (negative result to step 325), an error code is returned (step 330) to the client system (105).

If the method name is found in the data structure (135) (positive result to step 325), the process passes to step 335 wherein the map component (129) maps the method name in the method call to the corresponding method name of the server object (230) method. The process then passes to step 340 wherein a method call comprising the mapped method name, the state to be manipulated and any input and output parameters is processed in the usual way—the method is executed and results are returned to the client system (105). It can be seen that the process of the present invention allows an incompatible client entity and server entity to communicate. An operation identifier in the request constructed in one format is mapped to a corresponding operation identifier of the server entity operation constructed in another format, so that the request can be executed.

In a second example, the language of the server object (230) is constructed in English (i.e. a first format) and the request from the client object (210) comprises a method call constructed in English (i.e. a second format), wherein the first and second formats are the same. When the process of FIG. 3 is executed, since the format of the method name in the request is constructed in English and the method name of the server object (230) method is constructed in English, a positive result is returned to step 315. The process then passes to step 340, wherein the method call is processed in the usual way.

It should be understood that other formats as well as national language can be supported. In an example, the method names (e.g. Get, Set) of a server object can be deprecated and replaced with different method names (e.g. Obtain, Place). In this case, the data structure (135) will comprise a set of associations between the existing method names and the new method names.

In another example, the client entity and client request are constructed in a Double Byte Character Set (DBCS) language (e.g. Simplified Chinese) and the server entity and its operations are constructed in a Single Byte Character Set (SBCS) language (e.g. English). In this case, the data structure (135) will comprise a set of associations between an operation identifier in the DBCS format and the corresponding operation identifier constructed in the SBCS format.

In yet another example, the client entity and client request are constructed in a language format that reads from the right to the left (e.g. Arabic) and the server entity and its operations are constructed in a language format that reads from left to right (e.g. French). In this case, the data structure (135) will comprise a set of associations between an operation identifier in the request and the corresponding operation identifier of the server entity. In this example, the analysis component (126) is configured so that it analyses the request from right to left as well as from left to right.

We claim:

1. A method of distributed communications for use in a distributed environment comprising a first data processing system having an associated first entity;

a second data processing system having an associated second entity;

wherein the first entity sends a request to the second data processing system for an operation associated with the second entity, the request comprising an operation identifier in a first format and the operation comprising an operation identifier in a second format; and a data structure comprising an association between the operation identifier in the first format and the operation identifier in the second format;

the method further comprising:

intercepting the request;

parsing the request to determine the operation identifier of the request;

determining the format of the operation identifier of the request;

searching the data structure for the operation identifier of the request in the first format;

mapping, responsive to a successful search, the operation identifier in the first format to the operation identifier in the second format, wherein the operation identifier in the first format is present in the data structure; and executing, responsive to the mapping, the request on the second entity.

* * * * *